(12) United States Patent
Lamberson

(10) Patent No.: US 9,976,810 B2
(45) Date of Patent: May 22, 2018

(54) WATER RECOVERY FROM COOLING TOWER EXHAUST

(71) Applicant: Pacific Airwell Corp., Sacramento, CA (US)

(72) Inventor: Jeffery M. Lamberson, El Dorado Hills, CA (US)

(73) Assignee: Pacific Airwell Corp., Sacramento, CA (US)

( * ) Notice: Subject to any disclaimer, the term of this patent is extended or adjusted under 35 U.S.C. 154(b) by 49 days.

(21) Appl. No.: 15/281,594

(22) Filed: Sep. 30, 2016

(65) Prior Publication Data

US 2017/0097198 A1   Apr. 6, 2017

Related U.S. Application Data

(60) Provisional application No. 62/235,668, filed on Oct. 1, 2015.

(51) Int. Cl.

| F28C 1/00 | (2006.01) |
|---|---|
| F28F 17/00 | (2006.01) |
| F28B 9/06 | (2006.01) |
| F28F 25/00 | (2006.01) |
| F25B 11/02 | (2006.01) |

(52) U.S. Cl.
CPC ............... F28C 1/003 (2013.01); F28B 9/06 (2013.01); F28F 17/005 (2013.01); F25B 11/02 (2013.01); *F28C 2001/006* (2013.01); *F28F 2025/005* (2013.01)

(58) Field of Classification Search
CPC ...... F28C 1/003; F28C 2001/006; F28C 1/08; F28B 9/06; F28F 17/005; F28F 2025/005; F25B 11/02; F25B 27/02; F22D 11/06

USPC .......................................................... 62/121
See application file for complete search history.

(56) References Cited

U.S. PATENT DOCUMENTS

| 1,986,529 | A | * | 1/1935 | Ray | .......................... | F24F 6/12 |
|---|---|---|---|---|---|---|
| | | | | | | 261/128 |
| 3,423,078 | A | * | 1/1969 | May | .......................... | F28B 3/04 |
| | | | | | | 122/1 R |
| 4,107,940 | A | * | 8/1978 | Schlom | .................... | F24F 3/14 |
| | | | | | | 261/128 |

(Continued)

FOREIGN PATENT DOCUMENTS

| CN | 103292611 A | 9/2013 |
|---|---|---|
| CN | 203216311 U | 9/2013 |
| CN | 203657540 U | 6/2014 |

*Primary Examiner* — Emmanuel Duke
(74) *Attorney, Agent, or Firm* — Heisler & Associates

(57) ABSTRACT

To recover water from a cooling tower exhaust an air entry is provided adjacent thereto which feeds into a cooling heat exchanger. The cooling heat exchanger reduces a temperature of the wet air entering the air entry, causing condensation of water. This condensed water is captured and discharged from the system separate from dry air. A pre-cooler loop can be provided with a pre-cooler heat exchanger upstream of the cooling heat exchanger and fed by a cool line with a cold working fluid drawing heat out of the wet air. The pre-cooler heat exchanger can have its working fluid re-cooled in a second heat exchanger which exchanges heat with the cooler dry air downstream of the cooling heat exchanger. The cooling heat exchanger has a cold fluid passing therethrough which is cooled by a refrigeration system or some other cold fluid source.

18 Claims, 3 Drawing Sheets

(56) References Cited

U.S. PATENT DOCUMENTS

| | | | | |
|---|---|---|---|---|
| 4,361,524 A | * | 11/1982 | Howlett | F28C 1/16 |
| | | | | 261/150 |
| 4,936,881 A | * | 6/1990 | Jorzyk | F28C 1/003 |
| | | | | 261/109 |
| 2010/0242516 A1 | | 9/2010 | Seo | |
| 2011/0174003 A1 | * | 7/2011 | Wenger | F28C 1/06 |
| | | | | 62/121 |
| 2012/0180512 A1 | * | 7/2012 | Laing | F01K 9/003 |
| | | | | 62/238.6 |
| 2013/0213888 A1 | * | 8/2013 | Tempest, Jr. | C02F 9/00 |
| | | | | 210/638 |
| 2014/0338391 A1 | | 11/2014 | Keisling | |

\* cited by examiner

WATER RECOVERY FROM COOLING TOWER EXHAUST

CROSS-REFERENCE TO RELATED APPLICATIONS

This application claims benefit under Title 35, United States Code § 119(e) of U.S. Provisional Application No. 62/235,668 filed on Oct. 1, 2015.

FIELD OF THE INVENTION

The following invention relates to water recovery systems for use with the substantially saturated humid air exiting an exhaust of a cooling tower. More particularly, this invention relates to water recovery systems which are fed with the substantially saturated humid air from an evaporative cooling tower, from small rooftop type units to large free standing units, and then dehumidify that air to produce a source of liquid water.

BACKGROUND OF THE INVENTION

Water is a precious commodity, especially water that is sufficiently pure to be utilized for landscaping, agriculture or as potable water. As water becomes more scarce and water demand increases, potential sources for reclaiming of usable water warrant investigation. Large volumes of water are involved in evaporative cooling heat exchangers. One form of evaporative heat exchanger is an evaporative cooling tower (also called a wet air cooling tower). Evaporative cooling towers distribute water near the top of a tower having a hollow central core, typically sprayed into the tower. Air passes up through the tower (either forced by a fan or by natural convection), resulting in warm moist air being discharged from an upper end of the cooling tower. Falling water cooled by the transfer of moisture to the air is collected at a lower end of the cooling tower and is then usable as a heat exchange fluid to cool a working fluid within a power plant (or as a chilled water for air conditioning or for other uses). Such cooling towers are also utilized with air conditioning systems, often mounted upon the roof of a large building. For power plants, such cooling towers are typically freestanding.

One common attribute of such cooling towers is that they discharge relatively warm moist air therefrom. Exceptionally large amounts of water are lost to the atmosphere in the form of the humid air being discharged from the heat exchanger. Other forms of evaporative heat exchangers also include a discharge which includes moist air. This moist air is a source of moisture available for recovery.

As an example of the large amounts of water utilized to cool power plants, a rough estimate of the number of gallons of water used per day by the entire United States for all purposes is 400 billion gallons of water. A rough estimate of the number of gallons of water utilized in the cooling of power plants in the United States is 200 billion gallons per day. Thus, approximately half of all water usage in the Unites States is water usage within power plants. As water becomes more scarce, an increasing need exists to reclaim water used in power plants, and particularly water used in a condenser portion of thermal power plants, such as the large amounts of water utilized by evaporative cooling towers.

One known mechanism for altering the humidity of air is generally referred to as a dehumidifier. While dehumidifiers can come in a variety of different configurations, one common form of dehumidifier shares many attributes with an air conditioning system. In particular, relatively warm moist air has water extracted therefrom by first cooling the air to a lower temperature. Lower temperature air cannot hold as much water for a given volume as can warm air. Hence, by cooling the air, moisture precipitates out of the air as a liquid. The air has thus been effectively dehumidified. In many dehumidifiers, a second portion of the dehumidifier reheats the cooled and dehumidified air, such as back to an inlet temperature for the air. Such heating can occur by heat exchange with the warm moist air entering the dehumidifier to pre-cool this warm moist air and decrease the power requirements of the dehumidifier.

Regardless of the configuration of the dehumidifier, it serves the basic purpose of extracting moisture from the air. The effectiveness at which the dehumidifier removes water from the air is a function of how much moisture is in the air initially.

SUMMARY OF THE INVENTION

With this invention, a cooling tower or other evaporative heat exchanger with a moist air discharge is coupled with a dehumidifier or other water condenser to extract and recover the water that otherwise would be lost. The warm moist air being discharged from a wet cooling tower can be exceptionally large. Hence, such discharge air from a cooling tower is particularly beneficial as a source of warm moist air to be entered into a dehumidifier or other water condenser for extraction of water therefrom. The dehumidifier is preferably of a type which reheats the air after it has been cooled and dehumidified and pre-cools the incoming wet air, so that a relatively low power requirement is associated with the dehumidifier. Hence, water can be extracted from the warm moist air discharging from the cooling tower without having a particularly high power requirement.

While some dehumidifiers could operate on a small scale, such as a personal scale suitable for a few rooms in a house, large industrial moist warm air sources, such as those being discharged from a evaporative cooling tower, provide ideal sources of warm moist air from which to extract large volumes of water in a more efficient manner.

With this invention a dehumidifier unit has an entry for warm moist air and an outlet for dehumidified air. This inlet is placed adjacent to the wet air exhaust of a cooling tower or other evaporative heat exchanger moist air discharge. The device also has an outlet for liquid water. A cooling system within the dehumidifier, featuring a cooling wet exchanger, takes the incoming most air down to a lower temperature and water is precipitated therefrom as a liquid. Typically, the dry cool air is then utilized to pre-cool the incoming warm moist air and to (typically) return the cool air back to close to ambient temperatures. In this way, the dehumidifier has a relatively low power usage and yet effectively extracts water from the air.

Most preferably, an inlet to the dehumidifier is in the form of an entry hood coupled to a wet air discharge, such as at the top of a cooling tower. In one embodiment all the air from the cooling tower can be diverted to the dehumidifier (or a group of dehumidifiers) so that all of the warm moist air leaving the cooling tower has an opportunity to have water extracted therefrom. The water is collected and then can be put to beneficial use, such as use in agriculture or landscaping (or potentially also as potable water if appropriate water contacting surfaces are constructed and maintained properly to satisfy various governmental requirements for drinking water quality.

In one embodiment, a cooling heat exchanger is fed with a cold fluid that causes heat to be transferred from the warm moist air. Sufficient heat is extracted to cause water to condense out of the wet air for collection separate from a dry air discharge. The cold fluid can be provided from a refrigeration sub-system or some other source. As an option, a pre-cooler can be provided to provide initial cooling of the wet air entering the system. This pre-cooler can be configured as a pair of heat exchangers with a common fluid passing therebetween, one heat exchanger in the relatively cool dry air discharge and the other heat exchanger in the relatively hot wet air downstream of the entry hood or other entry into the system.

OBJECTS OF THE INVENTION

Accordingly, a primary object of the present invention is to provide a system for collecting relatively hot humid air from the exhaust of an evaporative heat exchanger and to collect water therefrom.

Another object of the present invention is to capture phase-related water content from a cooling tower.

Another object of the present invention is to recover water from an evaporative cooling tower by routing exhaust of the cooling tower to a dehumidifier.

Another object of the present invention is to provide a method for collecting water from an exhaust of a cooling tower which allows the cooling tower to continue operating according to its design, while recapturing water from the exhaust thereof.

Another object of the present invention is to decrease an amount of water utilized by a cooling tower by collecting and condensing water from the exhaust of the cooling tower and routing this water back to the cooling tower.

Another object of the present invention is to provide a water recovery system attachable to a cooling tower which has low power requirements, such that water can be economically recaptured from the exhaust of the evaporative cooling tower.

Other further objects of the present invention will become apparent from a careful reading of the included drawing figures, the claims and detailed description of the invention.

DESCRIPTION OF THE PREFERRED EMBODIMENT

Figure 1:
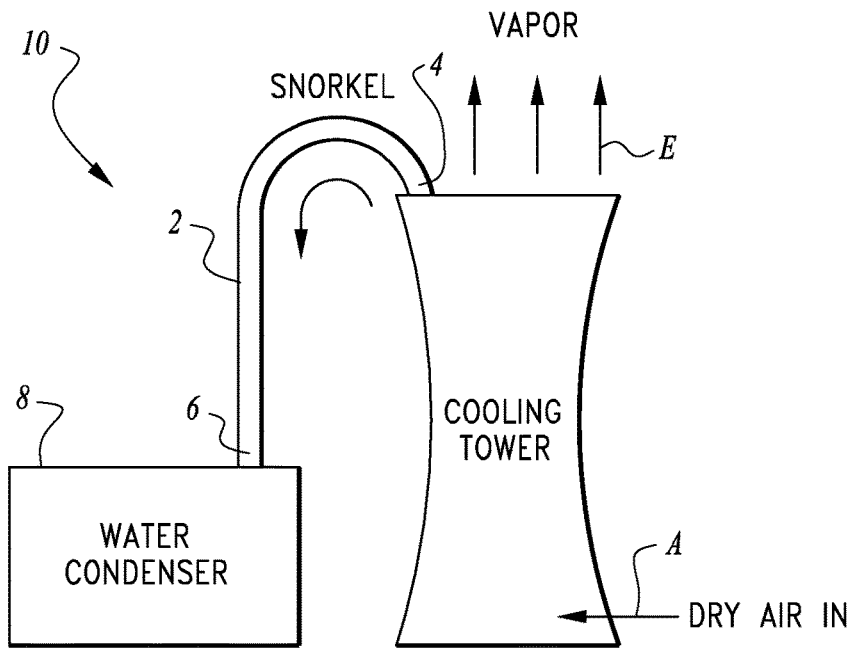
FIG. 1 is a schematic of the water recovery system of this invention with a snorkel used to capture a portion of exhaust from an evaporative cooling tower and feed it to a water condenser.

Referring to the drawings, wherein like reference numerals represent like parts throughout the various drawing figures, reference numeral 10 is directed to a water recovery system for collecting at least a portion of substantially saturated humid air from an exhaust of an evaporative cooling tower and then condensing water out of that substantially saturated humid air stream to recover water therefrom. The recovered water can be discharged from the system 10 or can be at least partially routed back to a water input W of the evaporative cooling tower to decrease water supply demands of the evaporative cooling tower.

Figure 3:
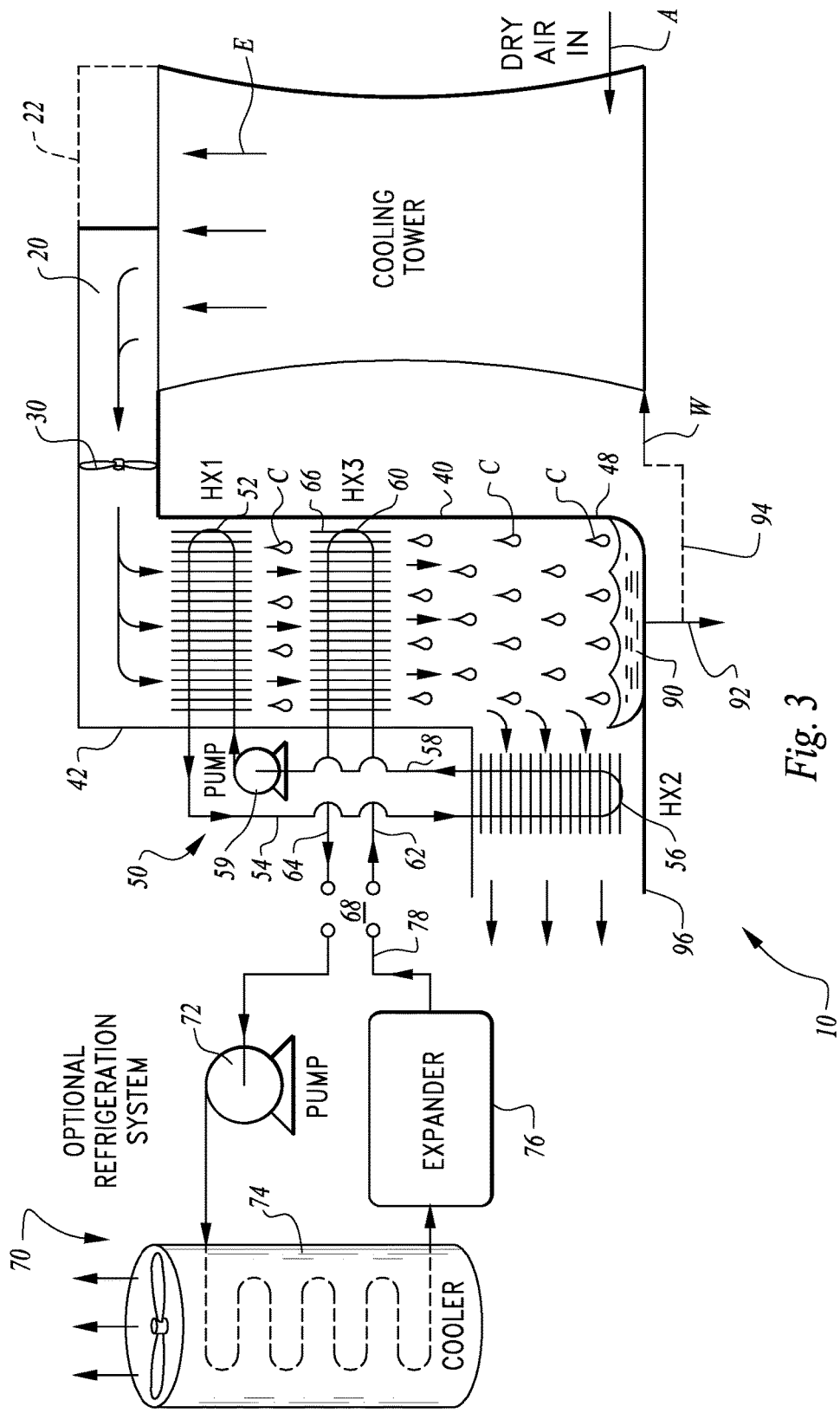
FIG. 3 is a schematic of an embodiment of the water recovery system of this invention which utilizes a pre-cooler loop as well as a cooling heat exchanger fed by a source of cold liquid, such as an optional refrigeration system and which condenses water and outputs water either for use separate from the system of this embodiment of the invention or recirculating at least a portion of the water back to a water inlet of the evaporative cooling tower.
Figure 4:
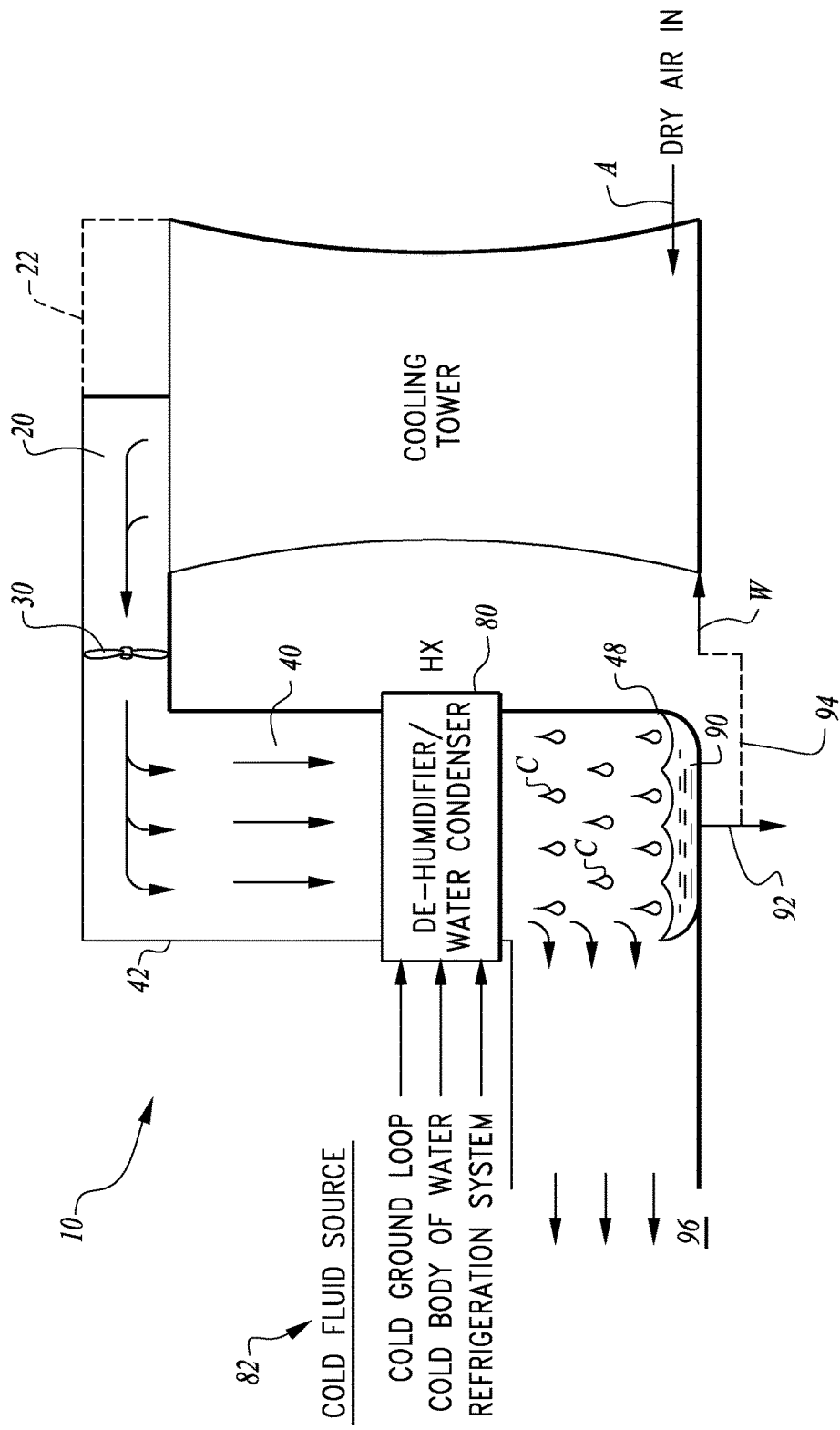
FIG. 4 is a schematic of an alternative embodiment of that which is shown in FIG. 3 with a dehumidifier/water condenser fed by cold fluid from one of a variety of different sources to cause condensation of the water for discharge from the system or recirculation back to the evaporative cooling tower.

In essence, and with particular reference to FIG. 3, basic details of the system 10 are described, according to one exemplary embodiment. The water recovery system 10 is located adjacent to a cooling tower so that an entry hood 20 can capture at least a portion of the wet air exhaust E from the evaporative cooling tower. A fan 30 or other air mover is located downstream of the entry hood 20 and draws the wet air into a water condenser. The condenser in this embodiment includes a column 40. The wet air passes downwardly through this column 40. At a minimum, a cooling heat exchanger 60 is provided to cool the wet air and cause water condensate C to condense out of the wet air for collection within a pool 90. A lower end 48 of the column 40 leads to a dry air outlet 96 and a water outlet 92 leads away from the pool 90. An optional pre-cooler loop 50 can be provided to pre-cool air before passing through the cooling heat exchanger 60, which pre-cooler loop 50 can be supplied with a cooled working fluid by transfer of heat with the cool dry air of the dry air outlet 96. A refrigeration system 70 provides one option for delivery of cold fluid to a cold fluid input of the cooling heat exchanger 60. Other sources of cold fluid (FIG. 4) could alternatively be provided to this cooling heat exchanger or other dehumidifier/water condenser 80 (FIG. 4).

Figure 2:
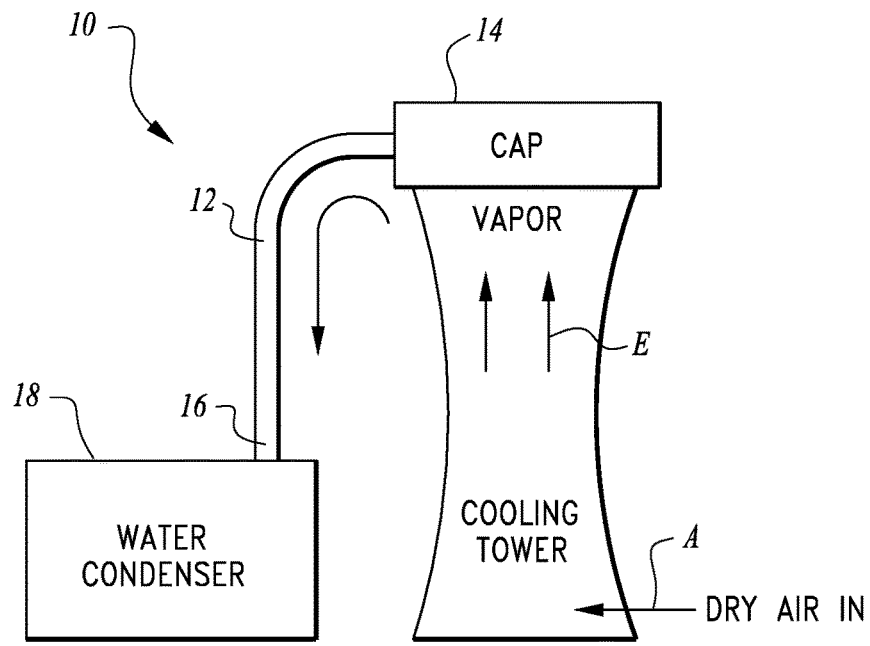
FIG. 2 is a schematic of a variation on the water recovery system of this invention where a cap captures all of the exhaust from an evaporative cooling tower and feeds it to a water condenser.

More specifically, and with particular reference to FIGS. 1 and 2, basic details of a generalized version of the water recovery system 10 are described. The water recovery system 10 can be configured to collect only a small portion of wet air in the exhaust E of the cooling tower, such as with a conduit that partially collects the exhaust E, called a snorkel 4 (FIG. 1) or to utilize a hood or related exhaust E collector, called a cap 14 (FIG. 2) to capture all (or at least most) of the wet air vapor from the exhaust E of the evaporative cooling tower. Utilizing the snorkel 2, an input 4 extends down into the exhaust E of the cooling tower and routes wet air, first up out of the exhaust E of the cooling tower, and then down to an output 6 at a lower end of the snorkel. The outlet 6 leads to a condenser 8 which cools the water sufficiently to cause water to condense out of the wet air passing through the snorkel 2.

In the example of FIG. 2, all of the wet air in the exhaust E is captured by the cap 14. This cap 14 could seal off the exhaust E of the cooling tower or could be configured as a hood which merely overlies the exhaust E of the cooling tower for capture of the wet air vapor leaving the exhaust E of the cooling tower, but without necessarily forcing all of the wet air into the cap 14. A pathway leads from the cap 14 to an output 16 adjacent to a condenser 18 for cooling and condensation of water out of the wet air in the exhaust E from the evaporative cooling tower.

With embodiments of FIG. 1 or 2, the water condenser 8, 18 can be any of a variety of different types of water condensers which generally provide cooling of the wet air sufficient to cause the air to be fully saturated with water and for the water in the air to condense into droplets which then can collect within the water condenser 8, 18 for discharge in liquid form therefrom. The water condenser 8, 18 would also discharge dry air therefrom (the phrase "dry air" is used to represent air with a lower absolute humidity than the "wet air" entering the system 10, but the "dry air" will typically have a high relative humidity, at least before reheating by the optional pre-cooler loop 50).

With particular reference to FIG. 3, an embodiment of the invention is disclosed which includes details of an optional pre-cooler loop 50 for pre-cooling the wet air and which operates by a simple circulation pump 59 and a pair of heat exchangers 52, 56. The embodiment of FIG. 3 also depicts one source of cold fluid for a cooling heat exchanger 60 for condensing of water from the wet air. In this embodiment, an evaporative cooling tower is fitted with the system 10 of this invention according to this embodiment.

Evaporative cooling towers can come in a variety of different configurations and sizes, ranging from rooftop cooling towers such as those associated with air conditioning systems to large stationary power plant cooling towers for condensing of a working fluid therein and which can stand hundreds of meters tall. The term "cooling tower" is thus broadly used to describe any heat transfer device which provides cooling (such as of a working fluid) by adding water to relatively dry air to at least partially facilitate cooling of the working fluid and which includes an upper end with an exhaust where wet air is discharged which has greater absolute humidity than air entering the cooling tower. This wet air is most typically substantially saturated humid air, typically having at least 80% to 90% (and often 100%) relative humidity. Typically this air has also been significantly heated so that when it leaves the evaporative cooling tower at the exhaust E, it is exhibiting an elevated temperature compared to ambient temperatures, and in many typical systems a temperature of 95° F. to 105° F.

Such evaporative cooling towers receive as inputs atmospheric air (also referred to as dry air, even though it would have an amount of moisture matching surrounding atmospheric conditions) and water. The water is primarily fed to misters or other water sprayers or distributors which are typically elevated within the cooling tower and come into contact with the dry air from the dry air inlet, causing the air to be moistened and cooled and for the water spray to evaporate.

Some water is also utilized in the cooling tower for "blowdown." Because the water utilized by the cooling tower often has dissolved solids, minerals, etc. therein and to counteract the deleterious effects associated with scaling and other accumulations of deposits within the water handling system, extra water is utilized during such blowdown to counteract the negative buildup. For some power plants water required for such "blowdown" procedures can account for as much as one-third or more of all water utilized by the cooling tower.

With continuing reference to FIG. 3, details of the entry hood 20, fan 30 and column 40 are described, which feed wet air into the water recovery system 10 of this embodiment of the invention. The entry hood 20 preferably overlies the exhaust E of the evaporative cooling tower so that wet air rising up out of the exhaust E of the cooling tower is routed into the entry hood 20. Preferably the entry hood 20 has sufficient suction, such as provided by the fan 30, that the wet air is not forced into the entry hood 20 and potentially producing back pressure within the cooling tower, but rather takes the wet air as it naturally flows out of the cooling tower exhaust E. This entry hood 20 could partially cover the exhaust E of the cooling tower, or as an option could be in the form of a full coverage hood 22.

An air mover is preferably provided downstream of the entry hood 20 which is preferably in the form of a fan 30. This fan 30 could be an axial fan with multiple blades extending from a central axle driven by a motor, or could be a centrifugal fan configured to input air closer to a central axis and then exhaust air radially from a prime mover of such a centrifugal fan. The air mover could alternatively be in the form of a blower or other air mover, such as a rotary lobe blower, a piston or gear or other pump/compressor. In one embodiment air pressure upstream of the fan is monitored and compared to desired downstream pressure at the exhaust E of the cooling tower. If the pressure upstream of the fan is higher than a desired pressure for the exhaust E of the cooling tower, the fan 30 can have its speed increased to avoid providing any back pressure on the cooling tower. In this way, the cooling tower stays within its designed parameters with the inclusion of the entry hood 20, and so that the cooling tower does not require redesign when the system 10 is employed. While a single fan 30 is shown and a single fan 30 is generally referenced, multiple fans, either in parallel or in series could be utilized to provide the air mover function of this invention.

The wet air is directed into an upper end of a column 40 in this embodiment. This column 40 is configured to provide a region in which the wet air can have water condensed therefrom for collection. While this column 40 is preferably vertically oriented and with a pool 90 at a lower end to collect condensate C condensing out of the wet air, these system elements could be oriented in a manner other than vertical in alternative embodiments which would not include the column 40 with the vertical orientation as depicted in this embodiment.

This column 40 generally includes an upper end 42 opposite a lower end 48. The upper end 42 typically includes a bend therein so that the wet air from the cooling tower, which has been moved laterally away from the cooling tower along a conduit which is typically generally horizontal, then bends into the vertically oriented column 40 at the upper end 42. Wet air flow then continues from the upper end 42 down toward the lower end 48 within this column 40. The column 40 would typically be a sealed housing which would also preferably be insulated, at least on lower portions thereof, so that ambient heating, such as from sunlight, does not effectively increase interior temperatures within the column 40. Reflective outer surfaces can also be utilized in this regard.

Within the column 40 at least one heat exchanger is provided to provide a function of a dehumidifier/water condenser 80 (FIG. 4) and so that condensate C condenses out of the wet air and collects within the pool 90 at the lower end 48 of the column 40. As depicted in FIG. 4, the dehumidifier/water condenser 80 can be fed with a cold fluid source 82 which can be any of a variety of different sources, typically of liquids, but potentially also of gases. Options for the cold fluid source include a refrigeration system producing a cold fluid, a cold body of water which can be circulated through the dehumidifier/water condenser 80, or can cool a working fluid which is routed to the dehumidifier/water condenser 80, or can be in the form of a cold ground loop which recirculates water or some other working fluid through a ground loop to cool the working fluid to a temperature similar to that within a subterranean space. If the cold fluid source is in the form of a refrigeration system, this refrigeration system can be such as the optional refrigeration system 70 (FIG. 3) or can be some other refrigeration system or other cooling system, according to cooling systems known in the prior art or hereafter invented.

Optionally but preferably, a pre-cooler loop 50 is also provided at least partially within the column 40. This pre-cooler loop 50 functions to transfer heat from the wet air near the upper end 42 of the column 40 to dry cool air exiting the lower end 48 of the column 40 through the dry air outlet 96. The pre-cooler loop 50 includes a first heat exchanger 52 and a second heat exchanger 56. The first heat exchanger 52 is located within the column 40 above the cooling heat exchanger 60. The second heat exchanger 56 is located adjacent to the dry air outlet 96.

A hot line 54 extends from the first heat exchanger 52 to the second heat exchanger 56 and routes a working fluid with a higher temperature than that in the cool line 58 from the first heat exchanger 52 to the second heat exchanger 56. The cool line 58 routes the working fluid at a cooler temperature than the working fluid in the hot line 54 from the second heat exchanger 56 to the first heat exchanger 52.

A circulation pump 59 is preferably located along either the hot line 54 or the cool line 58 to cause the working fluid to pass between the first heat exchanger 52 and the second heat exchanger 56. The working fluid could be water or some other heat transfer fluid. The heat transfer fluid preferably remains in a liquid state throughout its passage between the first heat exchanger 52 and the second heat exchanger 56.

This pre-cooler loop 50 beneficially pre-cools the wet air before it reaches the cooling heat exchanger 60. To do this, the cool line 58 feeds cool working fluid to the first heat exchanger 52 where it transfers heat through surfaces of the first heat exchanger 52 from the relatively hot wet air gathered by the entry hood 20, and in exchange causes this working fluid to heat up somewhat. This heated working fluid passes through the hot line 54 back to the second heat exchanger 56. The second heat exchanger 56 is configured to have the dry air 96 exiting the column 40 passed therethrough along surfaces which cause heat in a working fluid from the hot line 54 to be transferred to the dry air passing through the dry air outlet 96, and so that the working fluid is cooled back down to a lower temperature before it is fed back into the cool line 58. The only work that the circulation pump 59 needs to do is work sufficient to overcome fluid flow resistance within pathways for the working fluid including the hot line 54, cool line 58 and working fluid pathway(s) within the heat exchangers 52, 56.

Depending on the particular state of the wet air passing through the column 40 which impacts the first heat exchanger 52, condensate C may form on surfaces of the first heat exchanger as the wet air passes therethrough. If so, this condensate C will fall down through the column 40 and collect within the pool 90.

The cooling heat exchanger 60 can be provided alone or along with the pre-cooler loop 50. If provided with the pre-cooler loop 50, the cooling heat exchanger 60 will be the second heat exchanger which the wet air encounters within the column 40. If the pre-cooler 50 is not provided, the cooling heat exchanger 60 will be the first heat exchanger encountered by the wet air passing down through the column 40 or otherwise passing through the system 10 of this invention.

The cooling heat exchanger 60 has a cold fluid from a cold supply 62 that acts as a cold fluid input for the cooling heat exchanger 60. This cold fluid is typically a working fluid such as a freon or some freon substitute working fluid, but could be any of a variety of working fluids. The cold supply 62 passes through the cooling heat exchanger 60 where it collects heat through surfaces of the cooling heat exchanger 60 from the wet air. The cold supply 62 then is routed back to a return 64. Fins 66 are preferably provided radiating from the cold supply 62 and return 64 to enhance heat transfer from the cooling heat exchanger 60. Preferably these fins 66 are in the form of a plurality of parallel fins which are oriented within vertically extending planes to allow condensing water forming on surfaces of the fins 66 to freely drop down to the pool 90 below the cooling heat exchanger 60.

These fins 66 and piping through which the cold supply 62 and return 64 pass are preferably formed of materials which promote heat transfer and have a low propensity for undergoing a negative reaction with liquid water, such as a rusting type oxidation reaction. Various suitable materials could include various different stainless steel materials, aluminum, brass, or other suitable materials having the desired heat transfer attributes and attributes of durable operation over long periods of time with the temperature and humidity and liquid environment involved.

Preferably the cold supply 62 is below the return 64, and can be a single line or multiple lines of cold supply 62 and single or multiple lines of return 64. These lines including the cold supply 62 and return 64 extend relative to an interface 68. This interface 68 can generally be considered a point where a refrigeration system 70 or other cold fluid supply is provided into the cooling heat exchanger 60 and which receives the return 64 back from the cooling heat exchanger 60.

In the embodiment depicted in FIG. 3, this interface 68 is coupled to an optional refrigeration system 70. This optional refrigeration system 70 has a fluid pathway therethrough which generally takes a working fluid from the return 64 and routes it back to the cold supply 62 with the working fluid having been cooled therebetween. To cool this working fluid, according to this optional refrigeration system 70, the working fluid is first pumped at a pump 72 to an elevated pressure. The elevated pressure working fluid is then cooled at a cooler 74. This cooler generally cools the working fluid to remove heat which is added to the working fluid when it is compressed by the pump 72. After this heat of compression and any other heat (which can simply be rejected to a surrounding atmosphere or other convenient low temperature source) has occurred, the high pressure cooled working fluid is passed through an expander 76. At the expander 76 the working fluid is expanded from the high pressure of the pump 72 outlet back to a supply pressure for the cooling heat exchanger 60 which is generally similar to the pressure of the working fluid in the return 64 and feeding the pump 72. With such expansion to the lower pressure, the working fluid has its temperature reduced so that it is able to effectively remove heat from the wet air when passing through the cooling heat exchanger 60.

Depending on the configuration of the refrigeration system 70, the working fluid could remain a liquid or could undergo boiling into a gas when passing through the cooling heat exchanger 60, in which case, the pump 72 would be in the form of a compressor pump for gases rather than a liquid pump. Furthermore, if the pump 72 is in the form of a gas compressor, the cooler 74 would generally be in the form of a condenser coil or other condenser where the gaseous working fluid would be cooled sufficiently to condense back into a liquid. Should some other form of refrigeration cycle be employed, it could merely be swapped with the optional refrigeration system 70 at the interface 68 and supply the cool working fluid to this cold supply 62 and return this working fluid at the return 64 back to any such other refrigeration or cooling source.

The cooling heat exchanger 60 has a lowermost surface thereof with fins 66 and/or the cold supply 62 providing a coolest location within the column 40 or other pathway of the water recovery system 10. Thus, the wet air passing through the column 40 or other water recovery system 10 will at this lower edge of the cooling heat exchanger 60 have reached a lowest temperature where the wet air is least able to hold water in an evaporated state. All water in excess of what can remain evaporated within the air is condensed into condensate C and falls from the cooling heat exchanger 60 for collection within the pool 90.

Because these condensate C droplets fall under force of gravity, they will collect within the pool 90 and avoid turning the corner at the lower end 48 of the column 40 which then leads horizontally out to the dry air outlet 96 (or optionally a more than 90° bend so that the dry air outlet 96 is somewhat above the lower end 48 of the column 40). Before this dry air passes out of the dry air outlet 96, if the pre-cooler loop 90 is provided, a working fluid has its heat removed by heat transfer to dry air passing through the dry air outlet 96 and passing through the second heat exchanger 56. The second heat exchanger 56 will heat the dry air exiting the dry air outlet 96 by transfer of heat to the working fluid in the hot line 54, cooling this working fluid before feeding it into the cool line 58 leading back to the first heat exchanger 52. Thus, the cool air at the dry air outlet 96 is not "wasted" but rather beneficially removes heat collected by the first heat exchanger 52 in the pre-cooler loop 50 and restores this working fluid in the pre-cooler loop 50 back to a low temperature for passage through the cool line 58 and for beneficial use within the first heat exchanger 52 for cooling of the incoming wet air downstream of the entry hood 20. As this second heat exchanger 56 of the pre-cooler loop 50 would tend to heat the dry air passing through the dry air outlet 96, this second heat exchanger 56 is located sufficiently far from the pool 90 and lower end 48 of the column 40 so that the heating associated therewith does not cause any of the condensate C to re-evaporate.

While the water recovery system 10 can be provided as a system completely separate from the cooling tower and any power plant or other equipment which the cooling tower is integrated thereinto, various synergies can be further provided by integrating the system 10 of this invention with the cooling tower and any power plant or other related systems to which the cooling tower is operating. As one example, the power required by the fan 30, pump 59 and pump 72, and any other power requirements of the system 10 can beneficially be utilized by a power plant associated with the cooling tower. These power requirements will have an exceptionally low cost in that very little power transmission is required and the system 10 can operate on-site with the power plant so that it can utilize power from the power plant rather than requiring a source of outside power.

Furthermore, cooling towers require exceptional large amounts of water to operate effectively. A water outlet 92 from the pool 90 can be routed back to the cooling tower through a pathway 94 to supply at least part of the needs for the cooling tower. One particular benefit of utilizing water for the water inlet W of the cooling tower from such a pathway 94 leading from the water outlet 92 and the pool 90 of the system 10 is that this water, since it was condensed from evaporated water is substantially demineralized. Hence, the water from the pool 90, being a source of demineralized water, can allow the cooling tower to operate without requiring periodic "blowdown" or while requiring significantly lesser intervals of blowdown. Thus, the very large water demands of blowdown can be reduced or entirely eliminated, and the water cost for operating the cooling tower is at least partially mitigated by the water recovered by the water recovery system 10 of this invention.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A system for recovery of water from an exhaust of an evaporative cooling tower, comprising in combination:
   an air entry;
   an air mover downstream from said air entry;
   a cooling heat exchanger having a cold fluid input, said cooling heat exchanger located downstream of said air entry and with heat transfer surfaces through which heat transfers from the air downstream of said air entry to a cold fluid passing through said cold fluid input;
   a condensed water collection downstream from said cooling heat exchanger; and
   an air outlet downstream from said cooling heat exchanger.

2. The system of claim 1 wherein said air entry includes a snorkel having an input and an output, said input opposite said output, with said input and said output both facing at least partially downwardly and with an elevated portion between said input of said snorkel and said output of said snorkel.

3. The system of claim 1 wherein said air entry includes a hood oriented to capture rising wet air from the exhaust of the evaporative cooling tower.

4. The system of claim 3 wherein said air mover includes a fan, said fan oriented to drive the exhaust of the evaporative cooling tower into said hood and through said cooling heat exchanger.

5. The system of claim 4 wherein said fan includes an axial fan with multiple blades radiating from a central hub.

6. The system of claim 4 wherein said fan includes a centrifugal fan.

7. The system of claim 3 wherein said air mover includes a blower.

8. The system of claim 1 wherein said cold fluid input of said cooling heat exchanger is fed by cold fluid downstream of a refrigeration subsystem.

9. The system of claim 8 wherein said refrigeration subsystem includes a pump coupled to a source of working fluid, said pump pumping said working fluid to an elevated pressure, a cooler downstream of said pump, said cooler removing heat from the working fluid, and an expander downstream from said cooler, said expander expanding the working fluid to a lower pressure and causing the working fluid to be reduced in temperature to provide the cold fluid to said cold fluid input of said cooling heat exchanger.

10. The system of claim 1 wherein said condensed water collection includes a pool located below said cooling heat exchanger.

11. The system of claim 1 wherein a pre-cooler heat exchanger is located between said air entry and said cooling heat exchanger, said pre-cooler heat exchanger having a pre-cooler cold fluid passing through said pre-cooler heat exchanger at a lower temperature than a temperature of wet air from the exhaust of the evaporative cooling tower.

12. The system of claim 11 wherein said pre-cooler cold fluid is fed by a pre-cooler loop which includes a second heat exchanger located downstream from said cooling heat exchanger, and with a hot line in said pre-cooler loop extending from said pre-cooler heat exchanger to said second heat exchanger to return said pre-cooler cold fluid from an elevated temperature when the pre-cooler cold fluid is outputted from said pre-cooler heat exchanger back to a lower temperature after transferring heat at said second heat exchanger to air downstream from said cooling heat exchanger.

13. The system of claim 1 wherein said condensed water collection includes a water outlet, with at least a portion of said water outlet upstream of a water input into the evaporative cooling tower.

14. A method for recovery of water from an exhaust of an evaporative cooling tower, including the steps of: collecting saturated humid air from the exhaust of the evaporative cooling tower; routing the saturated humid air of said collecting step to a cooling heat exchanger having a cold fluid input; transferring heat at the cooling heat exchanger from the saturated humid air to the cold fluid of the cold fluid input, sufficient to cause condensation of liquid water out of the saturated humid air; collecting the condensed water; and outputting air with lesser absolute humidity than the saturated humid air of said collecting step.

15. The method of claim 14 wherein said routing step includes an air mover positioned along a pathway between the exhaust of the evaporative cooling tower and a dry air outlet of said outputting step.

16. The method of claim 15 wherein said routing step includes balancing a flow rate of said air mover to maintain flow from the exhaust of the evaporative cooling tower maintaining design back pressure for the evaporative cooling tower, such that air flow through the evaporative cooling tower is not inhibited.

17. The method of claim 14 including the further step of pre-cooling the saturated humid air after said collecting step and before said transferring heat step.

18. The method of claim 17 wherein said pre-cooling step includes operating a pre-cooler loop having a hot line, a cool line, a first heat exchanger and a second heat exchanger, the first heat exchanger located upstream of the cooling heat exchanger, the second heat exchanger located downstream of the cooling heat exchanger, said cool line passing from said second heat exchanger to said first heat exchanger to direct a working fluid from the second heat exchanger to the first heat exchanger and the hot line extending from the first heat exchanger to the second heat exchanger to move the working fluid from the first heat exchanger to the second heat exchanger, the cool line passing the working fluid at a temperature lower than a temperature of the working fluid when passing through the hot line.

* * * * *